(12) United States Patent
Kim et al.

(10) Patent No.: US 12,082,740 B1
(45) Date of Patent: Sep. 10, 2024

(54) AIR CIRCULATION ELECTRIC ROASTER FOR A TABLE WITH SAFETY FUNCTION

(71) Applicants: Hoon Kim, Daegu (KR); Chan Park, Federal Way, WA (US); Yong Goo Cho, Daegu (KR)

(72) Inventors: Hoon Kim, Daegu (KR); Chan Park, Federal Way, WA (US); Yong Goo Cho, Daegu (KR)

( * ) Notice: Subject to any disclaimer, the term of this patent is extended or adjusted under 35 U.S.C. 154(b) by 0 days.

(21) Appl. No.: 18/415,378

(22) Filed: Jan. 17, 2024

(51) Int. Cl.
*A47J 37/06* (2006.01)

(52) U.S. Cl.
CPC ........ *A47J 37/0641* (2013.01); *A47J 2202/00* (2013.01); *A47J 2203/00* (2013.01)

(58) Field of Classification Search
CPC . A47J 37/0641; A47J 2202/00; A47J 2203/00
USPC ........................................................ 219/400
See application file for complete search history.

(56) References Cited

FOREIGN PATENT DOCUMENTS

| KR | 20000072768 A | * | 9/2000 |
| KR | 101114290 B1 | * | 9/2011 |

* cited by examiner

*Primary Examiner* — Nathaniel E Wiehe
*Assistant Examiner* — Ket D Dang
(74) *Attorney, Agent, or Firm* — PARK LAW FIRM

(57) ABSTRACT

The present invention pertains to an air-circulating electric roaster designed to enhance the safety of cooking utensils by interrupting the drive power based on temperature changes in the grill plate and the positional detachment of the roaster. The invention comprises an outer body 20 and an inner body 20b, with an electrically heated operating heating lamp 33c provided in the inner body 20b. It further includes a heating unit 30, a grill plate 40, a bottom cap 50, a blower 60, temperature and pressure detection means 70, a platinum catalyst filter 74 arranged externally on the inner body 20b, a water level sensor 77 positioned inside the oil collector 222b, and seismic vibration detection means 80 installed on the outer body 20. These components are integrated into an air-circulating electric roaster 10 and a control box 90 designed to inform about the operational status of the electric roaster.

10 Claims, 6 Drawing Sheets

[FIG. 1]
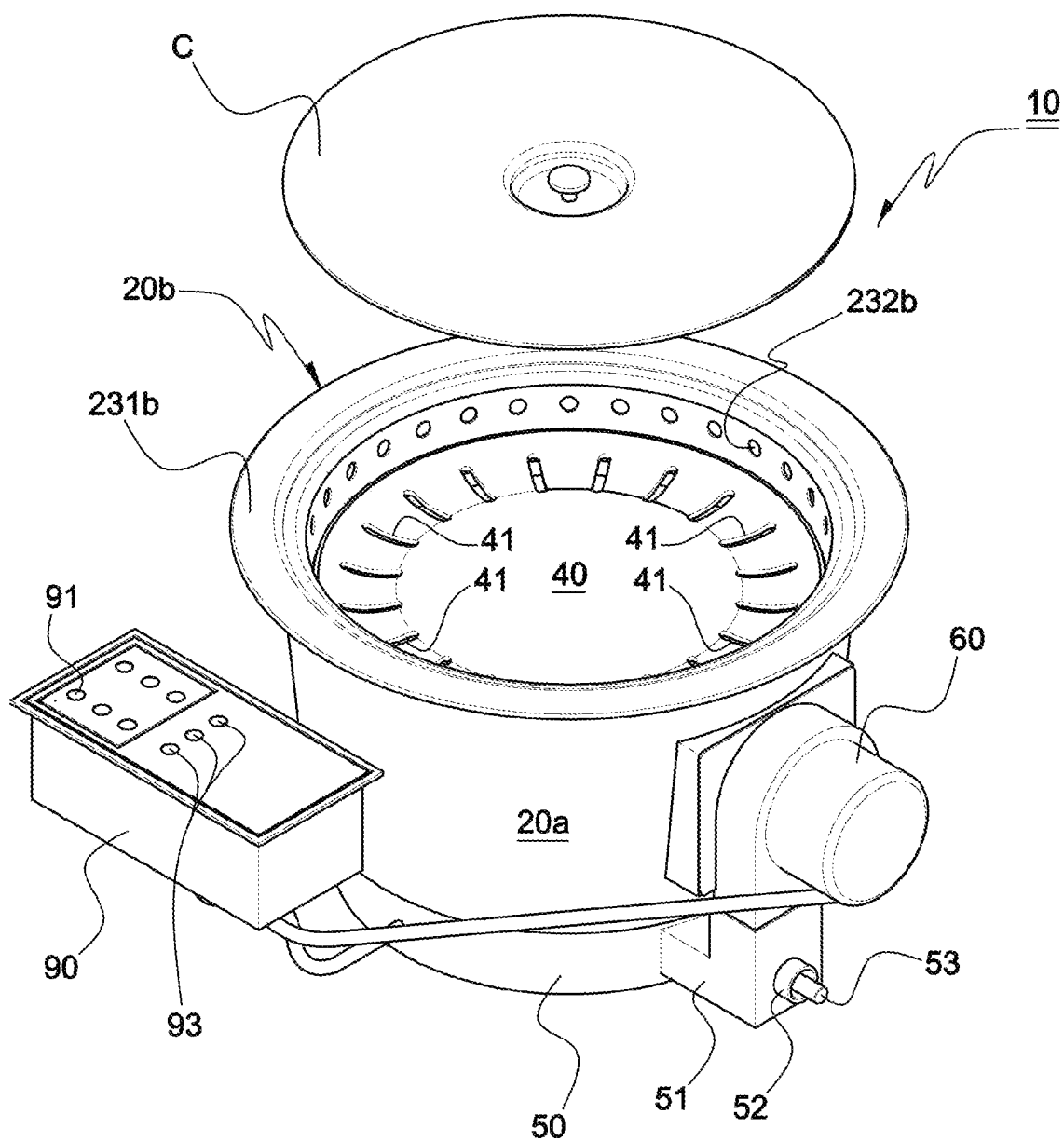

[FIG. 2]
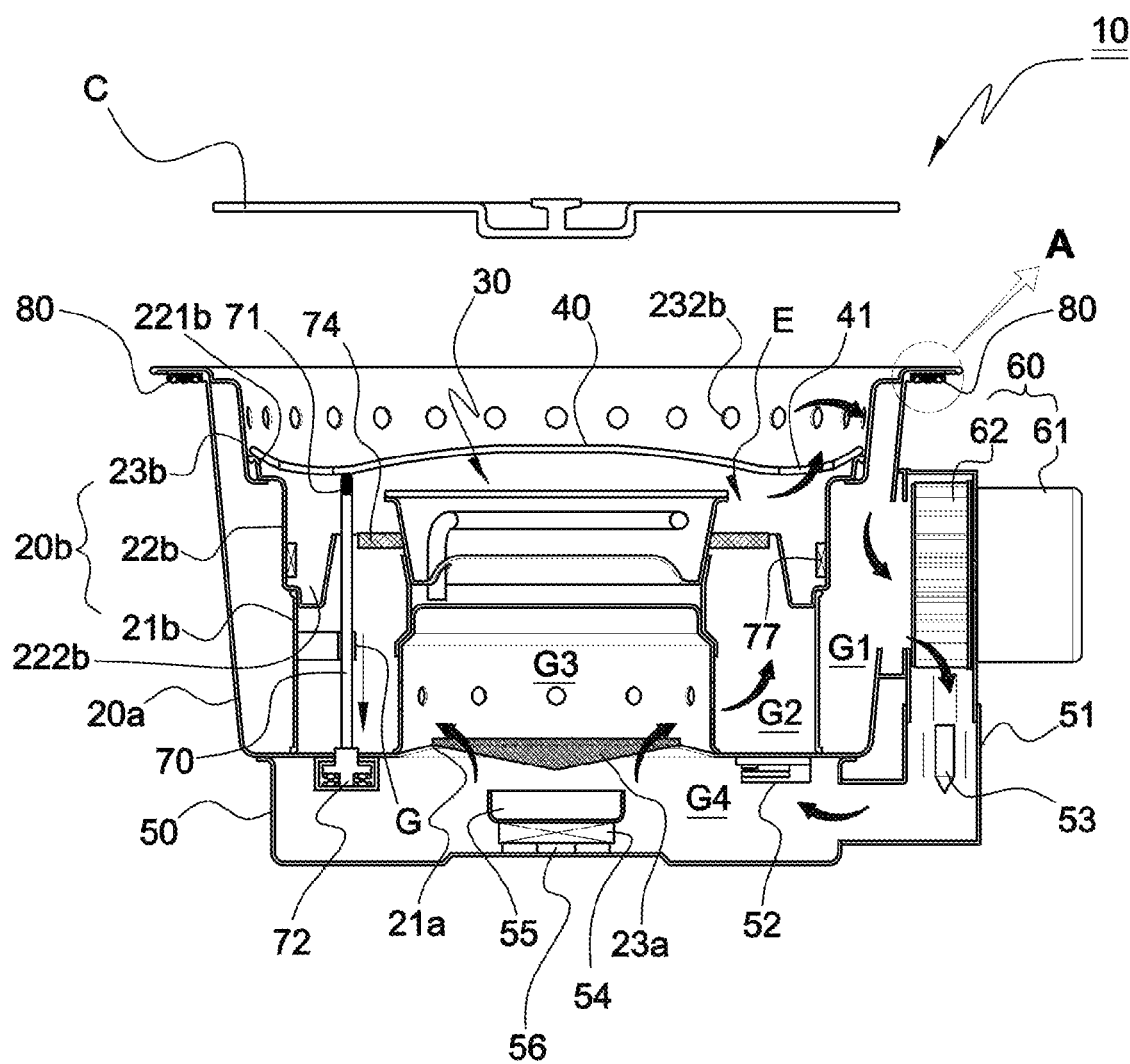

[FIG. 3]
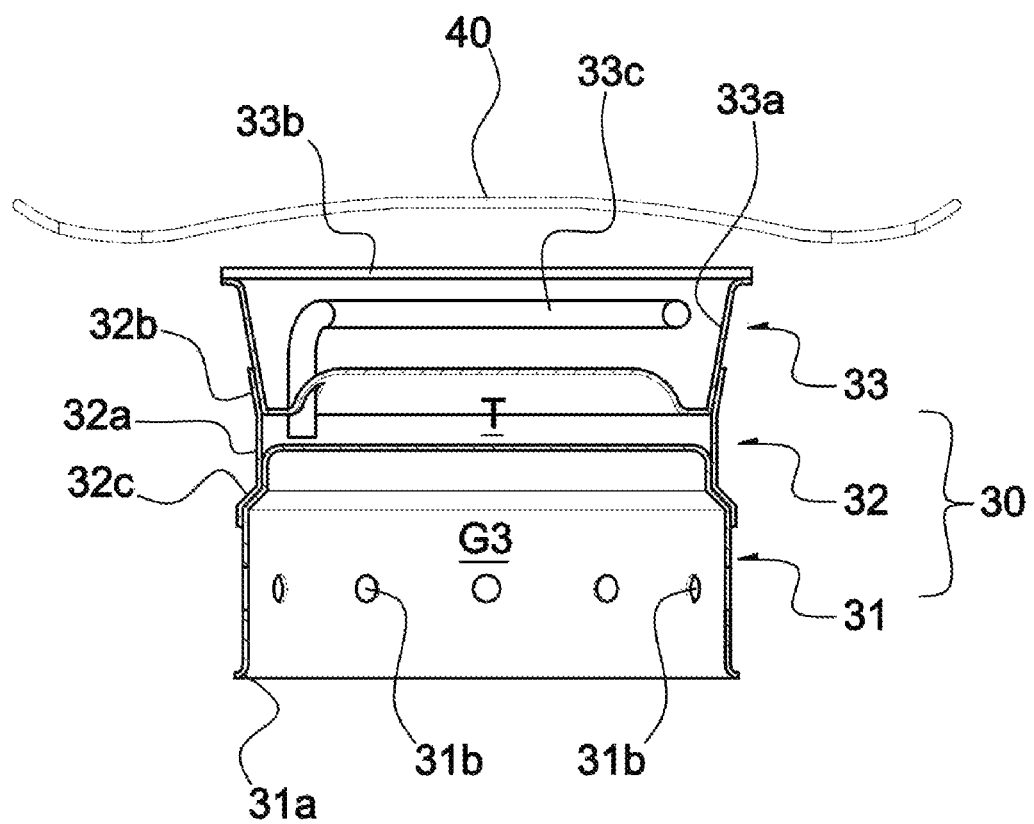

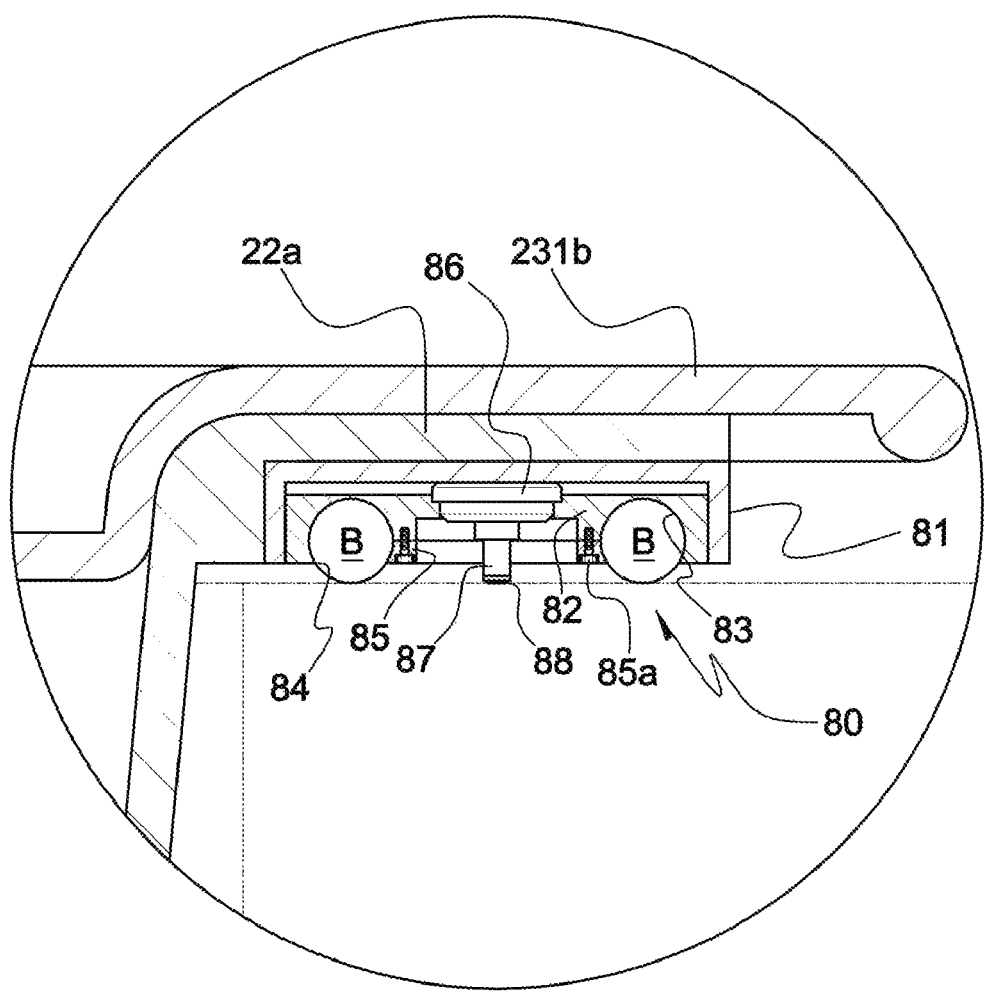
[FIG. 4]

[FIG. 5]
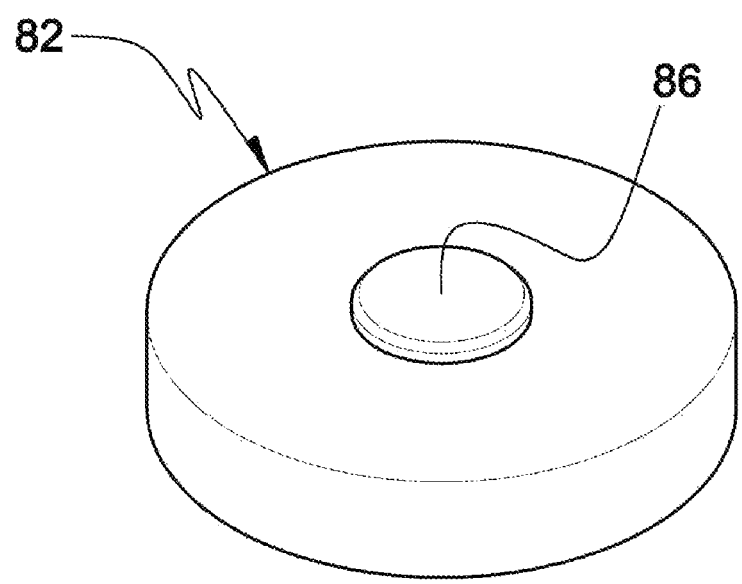

[FIG. 6]
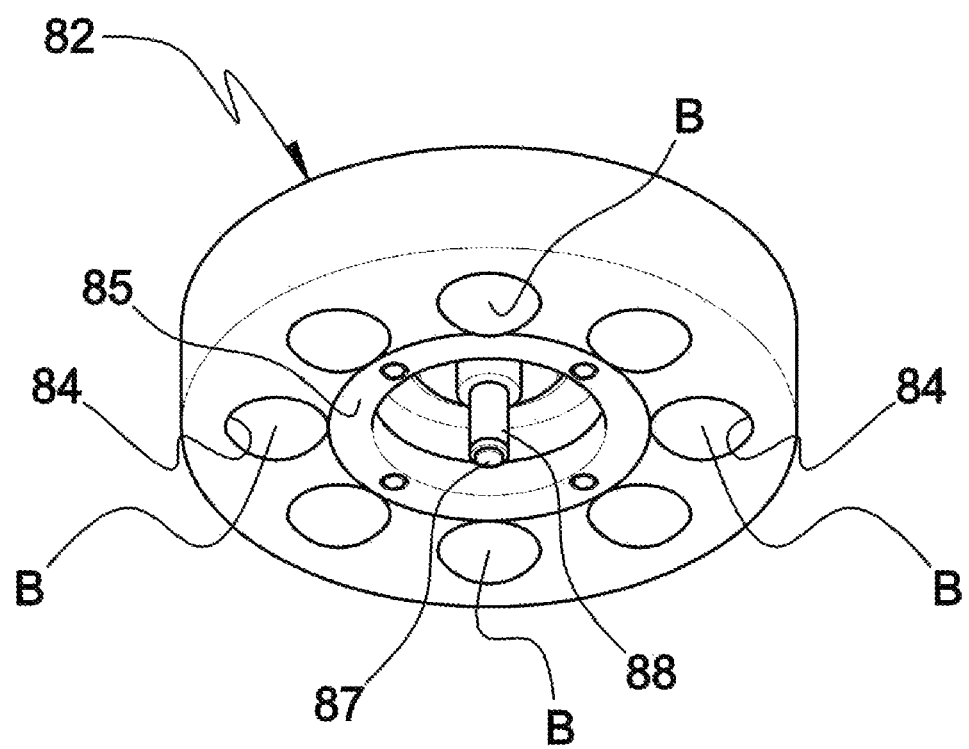

AIR CIRCULATION ELECTRIC ROASTER FOR A TABLE WITH SAFETY FUNCTION

FIELD OF THE INVENTION

This invention relates to an air circulation electric roaster for a table equipped with safety functions. More specifically, the invention pertains to an air circulation electric roaster for a table that reduces atmospheric pollution in the surrounding area where the roaster is used by pre-removing foreign substances (dust, oil, dioxins, nitrogen dioxide, etc.) generated during the cooking process, which would otherwise mix into the smoke. Additionally, the invention ensures safer use of cooking utensils by cutting off the power supply based on temperature changes in the grilling plate and the proper positioning of the roaster.

BACKGROUND OF THE INVENTION

When cooking meat by applying heat, proteins, moisture (juice), and oil (fat) combust and vaporize, producing a savory smoke that disperses into the surrounding air. The smoke generated during the cooking process of grilling meat may contain harmful substances to the human body, such as dust, rancid oil molecules, dioxins, nitrogen dioxide, etc. Therefore, attention must be paid to cooking processes and ventilation.

Moreover, the smoke produced during the process of grilling meat contains a significant amount of moisture and oil. When these come into contact with the table or building walls around the cooking equipment, unpleasant phenomena such as odor, discoloration, and dampness occur.

Various functional devices have been proposed for cooking utensils (roasters) designed to cook meat, including additional features. Functional cooking utensils include those that remove smoke and foreign substances during the cooking process and electrically heated cooking utensils (roasters) that avoid combustion of fuel.

Korean Patent Publication No. 10-2000-0072768 discloses an "odor and smoke removal device for a table roaster." The auxiliary cooking tool with such a configuration has an intake port positioned at a certain distance above the grilling plate (grill), allowing smoke generated during the cooking process of meat to be sucked in by a fan and then expelled to the outside of the building or into a separately provided container.

Korean Registered Patent No. 10-1114290 discloses an "electric roaster." This electric roaster has an intake port that wraps around the sides of the grilling plate that heats meat. The intake port sucks in smoke (air) mixed with foreign substances generated during the cooking process of meat, and the smoke, mixed with foreign substances, circulates inside the roaster body before being expelled through the exhaust port.

Korean Registered Patent No. 10-2473291 discloses an "air circulation roaster" that uses a heating lamp to convert electricity into heat, allowing cooking of food.

The present invention relates to an air circulation electric roaster designed to cook meat directly by applying heat, and it is configured to cut off the power supply based on temperature changes in the grilling plate and the proper positioning of the roaster, ensuring safer use.

SUMMARY OF THE INVENTION

In the case of a roaster equipped with a cooking aid device that has an intake port operated by a fan to suck in smoke generated during the cooking process of meat and allows the sucked smoke to be expelled to the outside of the building or into a separately provided container, the complete improvement of user inconvenience was not possible because the discharge of smoke was not perfect.

Moreover, issues such as the smoke intake port installed around the grilling plate obstructing the user's view or interfering with cooking operations have been pointed out.

Furthermore, in a roaster where an intake port is provided around the grilling plate to suction and discharge smoke generated during the cooking process of meat, not only is the removal of smoke and foreign substances not properly performed, but the emitted smoke contaminates the surrounding environment, creating discomfort for an unspecified number of people.

An electric roaster that can cook food using a heating lamp to convert electricity into heat poses a risk of fire due to overload or a short circuit, and there is a problem of the absence of means to prevent it.

The present invention has been created to address the problems arising from the cooking process of meat in conventional roasters, etc. The invention effectively removes smoke and foreign substances generated during the cooking process of meat, reducing air pollution in the surrounding area where the roaster is used. Furthermore, it automatically cuts off the power based on temperature changes in the grilling plate and the proper positioning of the roaster, ensuring safer use of the cooking utensil. The main point of the technical task is to provide an "Air Circulation Electric Roaster for Table with Safety Function."

The present invention for solving the aforementioned technical challenges is configured in the form of a cylindrical container with an open upper part; a through hole is formed in the central lower part, and a metal mesh is installed above the through hole, with the through hole configured to be covered by the mesh;

A first extension plate extending outward is provided on the upper part of the outer body and a plurality of vibration detection means (a plurality of vibration detectors) are installed at the lower part of the first extension plate, which is provided on the outer body, to detect vibrations exceeding a certain degree caused by various external impacts and transmit the detected signals to a control box;

A first support is fixed to the bottom surface of the outer body and a second support is formed at the top with a support base for a grill plate, a sealed hopper-shaped oil collector is formed in the inner downward direction to store water in its inner space, a second extension plate extending outward is formed at the top to fix the second extension plate to the top surface of the first extension plate of the outer body, and a third support is provided inside with a first ventilation hole allowing smoke generated during the process of heating meat on the side walls;

A level detection sensor installed on one side of the oil collector of the third support forming the inner body to detect the water level stored in the oil collector and transmit it to the control box;

A temperature and pressure detection means (a temperature and pressure detector) installed inside the inner body configured with a temperature sensor installed in the inner area of the inner body, supported to slide vertically by a guide member fixed to the inner body, with a temperature sensor contacting the lower part of the grill plate at the top, and a relay installed at the bottom to detect the weight of the grill plate applied to the temperature sensor, and when the grill plate deviates from the temperature sensor, the relay sends a detachment detection signal to the control box;

Attached to the lower part of the outer body, forming a fourth circulation passage inside, installing a connecting pipe on one side, and installing a heating heater that is heat-activated by power supplied through the control box in the central lower area, and installing a heating container capable of storing water on the top of the heating heater to form a bottom cap;

Installed on one side of the outer body, composed of a drive motor and a blower connected to the blower connected to one side of the bottom cap;

Installed at the bottom of the connecting path connecting the blower and the bottom cap, an external air inlet duct and a plasma generator installed in the external air inlet duct;

Installed below the upper heating element, measuring the weight of the water stored in the heating container to detect when the water stored in the heating container has decreased below a certain amount and transmit a signal to the control box, configured as a weight measuring device;

Installed on the top surface of the internal bottom of the outer body, erected in a shape that surrounds the through hole provided in the outer body with a support member having a plurality of second ventilation holes formed on the side walls, and formed with a first coupling part at the top to couple with the bottom of the heating member and a second coupling part formed at the bottom to allow the top of the support member to be inserted, thereby forming an insulating layer between the support member and the heating member, equipped with a support member, a heating member activated by electricity supplied from the control box on the inner side of the reflective member, formed as an integrated unit with a heating lamp that generates heat by electricity supplied from the control box in the inner area of the reflective member, and sealed the top of the reflective member with a protective glass, forming a heating member;

Installed around the heating member that forms the heating member, coated with platinum on a ceramic organized in a mesh shape, a platinum catalyst filter;

Installed externally to the outer body, if the temperature of the heating lamp exceeds the set limit or the grill plate detaches, it cuts off the power supplied to the heating lamp, and according to the temperature information of the grill plate transmitted through the temperature and pressure detection means, it illuminates a different color to inform the user of the temperature state of the grill plate in a visually intuitive manner, and according to the detection signal of the level detection sensor, it notifies the user of the timing to replenish water through an alarm warning light or alarm sound, and in case vibrations exceeding a certain degree are detected by the vibration detection means due to earthquakes or external physical forces, it can cut off the power supplied to the electric roaster, configured as a control box; comprising the technical features.

BRIEF DESCRIPTION OF THE DRAWINGS

The present invention will become more fully understood from the detailed description and the accompanying drawings, wherein:

FIG. 1 is a perspective view illustrating a preferred embodiment of the air-circulating electric roaster proposed in the present invention;

FIG. 2 is a cross-sectional view for reference explaining the internal structure of the present invention;

FIG. 3 is a cross-sectional view for reference extracting the heating unit according to the present invention;

FIG. 4 is a reference view extracting part A shown in FIG. 2;

FIG. 5 is a perspective view extracting the vibration detection means according to the present invention; and FIG. 6 is a bottom perspective view of the vibration detection means according to the present invention.

DETAILED DESCRIPTION OF THE PREFERRED EMBODIMENTS

The following detailed description of the invention will be made with reference to the attached diagrams. First, it should be noted that in the notation of the diagrams, identical components or parts are indicated by the same reference symbols as much as possible. Also, to avoid ambiguity in describing the essence of the technical concept intended by the invention, specific explanations of the functions or configurations of the related prior art are omitted.

In FIG. 1, a perspective view illustrating a preferred embodiment of the air-circulating electric roaster 10 proposed in the present invention is shown, and in FIG. 2, a reference cross-sectional view explaining the internal structure of the air-circulating electric roaster 10 proposed in the present invention is shown. Through these figures, it can be confirmed that the present invention is composed of an outer body 20a and an inner body 20b, arranged inside the inner body 20b, equipped with a heating unit 30 including a heating lamp 33c that operates electrically, a grill plate 40 supported on the inner body 20b, a bottom cap 50 coupled to the lower part of the outer body 20, a blower 60 placed on one side of the outer body 20a, a temperature and pressure detection means 70 placed between the inner body 20b and the heating unit 30, a platinum catalyst filter 74 placed on the outer side of the inner body 20b, a water level sensor 77 installed on the inner side of the oil collector 222b arranged in the inner body 20b, vibration detection means 80 installed on the outer body 20a to detect the vibration and movement of the electric roaster 10, and a control box 90 for controlling the operation and visually indicating the operating status of the electric roaster 10.

The outer body 20 according to the present invention is configured in the form of a cylindrical container with an open upper part. In the central lower part of the inner side of the outer body 20, a through hole 21a is formed, and a metal mesh 23a made of metal is installed above the through hole 21a to configure the through hole 21a to be covered by the mesh 23a. The upper part of the outer body 20 is provided with a first extension plate 22a extending outward. The mesh 23a is configured with a wedge shape protruding downward from the center.

Multiple vibration detection means 80 are installed on the lower part of the first extension plate 22a provided on the outer body 20 to prevent them from being exposed to the outside, and in the event of various external impacts such as earthquakes or collapses, the vibration detection means 80 detects the movement of the electric roaster 10 caused by vibrations and transmits the signal to the control box 90, thereby cutting off the power supplied to the electric roaster 10 to stop its operation. Configuring the vibration detection means 80 in this way can prevent various safety accidents caused by the unstable operation of the heating lamp 33c in advance.

The inner body 20b according to the present invention is primarily composed of first, second, and third supports 21b, 22b and 23b. The first support 21b is erected and fixed to the bottom surface of the outer body 20, the second support 22b is coupled to the top of the first support 21b, and the third support 23b is coupled to the top of the second support 2b.

The second support 22b forming the inner body 20b is formed with a support base 221b for the grill plate 40 on the inner top part, and a sealed hopper-shaped oil collector 222b is formed on the inner lower side to store water in the inner space of the oil collector 222b.

The third support 23b forming the inner body 20b is formed with a second extension plate 231b extending outward at the top, fixing the second extension plate 231b to the top surface of the first extension plate 22a of the outer body 20, thereby securely maintaining the installation state of the entire inner body 20b. Additionally, the second extension plate 231a can serve as a handle for transporting the electric roaster 10, and a first ventilation hole 232b is installed to allow the entry of smoke containing foreign substances (oil) generated during the heating of meat during the cooking process.

By configuring the outer body 20 and the inner body 20b as described above, a first circulation path G1 is formed between the inner and outer bodies 20b and 20a, and the first circulation path G1 serves as a passage for air circulation, functioning to insulate and minimize the escape of heat generated in the inner area of the inner body 20b to the outside, thereby reducing heat loss.

On one side of the oil collector 222b forming the third support 23b constituting the inner body 20b, a water level sensor 77 is installed to detect the water level stored in the inner space and transmit it to the control box 90. Additionally, a cover C may be provided at the top of the third support 23b to prevent the discharge of heat, thereby reducing cooking time.

By adding a water level sensor 77 to the oil collector 222b as described, the control box 90 receiving the detection signal can notify the timing for replenishing water through means such as a warning light 91 or alarm sound. This ensures the maintenance of an optimal water level, allowing the system to consistently exhibit optimal functionality.

Temperature and pressure detection means 70 are installed in the inner area of the inner body 20b. The temperature and pressure detection means 70 is vertically supported by a guide member G fixed to the inner body 20b, and a temperature sensor 71 is installed on the top of the temperature and pressure detection means 70 to contact the lower part of the grill plate 40. At the bottom of the temperature and pressure detection means 70, a relay 72 is installed to detect the weight of the grill plate 40 applied to the temperature sensor 71. If the grill plate 40 detaches from the temperature sensor 71, the relay 72 detects it and sends a detachment signal to the control box 90.

By incorporating temperature and pressure detection means 70, in case of detachment of the grill plate 40, the control box 90 receiving the corresponding detection signal activates the warning light 91, ventilates to attract attention, and cuts off the power supplied to the heating lamp 33c in the heating unit 30, thus preventing various safety accidents caused by the unsafe operation of the heating lamp 33c.

The lower part of the outer body 20 according to the present invention is coupled with a bottom cap 50, forming a sealed storage container. Simultaneously, a fourth circulation path G4 is created in the inner area of the bottom cap 50, and through a through hole 21a formed in the outer body 20, the fourth circulation path G4 is designed to communicate with the third circulation path G3 inside the support member 31 of the heating unit 30.

A bimetal temperature sensor 52 is installed at the lower part of the outer body 20. If the temperature of the air passing through the fourth circulation path G4 exceeds the set temperature, the bimetal temperature sensor 52 detects it and transmits a detection signal to the control box 90, which then cuts off the power supplied to the heating lamp 33c and heating element 54.

A blower 60 is installed on one side of the outer body 20, consisting of a drive motor 61 and a blower fan 62. A connecting path 51 is installed on one side of the bottom cap 50 and is connected to the blower fan 62 of the blower 60, allowing air blown by the blower 60 to be supplied to the fourth circulation path G4 through the connecting path 51.

In the central area of the bottom cap 50, a heating element 54 driven by power supplied through the control box 90 is installed. Additionally, a heating container 55 capable of storing water is installed above the heating element 54, allowing the heating element 54 to heat the water in the heating container 55 to generate steam.

With this configuration, the water heated by the heating element 54 vaporizes into steam, rises, and passes through the metal mesh 23a installed in the through hole 21a of the outer body 20. Condensation occurs due to temperature differences, forming water droplets on the metal mesh 23a in the form of mist. As the mist, along with smoke generated during the cooking process, passes through the fourth circulation path G4 and moves to the third circulation path G3 through the through hole 21a, it encounters water droplets on the metal mesh 23a, leading to the purification of smoke. Water droplets on the metal mesh 23a fall downward over time, and is stored in the heating container 55 while the wedge-shaped protrusion in the center of the metal mesh 23a prevents them from escaping to the outside of the heating container 55.

A weight measurement device 56 is installed beneath the heating element 54 to measure the weight of the water in the heating container 55. If the water in the heating container 55 decreases below a certain level, the weight measurement device 56 detects it and sends a signal to the control box 90. Consequently, the control box 90 stops the operation of the heating element 54 and activates the warning light 91, alerting the user to ventilate the surrounding area.

As a means for removing foreign substances included in the smoke circulating through the first, second, third, and fourth circulation paths G1, G2, G3 and G4 according to the present invention, a plasma generator 53 is installed in the connecting path 51 connecting the bottom cap 50 and the blower 60 blower fan 62. The plasma generated by the plasma generator 53 is designed to remove foreign substances in the smoke passing through the connecting path 51.

In FIG. 3, a cross-sectional view of the heating unit 30 according to the present invention is extracted. Through this extracted view, it can be confirmed that the heating unit 30 is composed of a sealed "n" shaped lower support member 31, a support member 32 coupled to the top of the lower support member 31, and a heating member 33 coupled to the top of the support member 32.

The lower support member 31 is installed at the top of the internal floor of the outer body 20. The lower support member 31 is erected in a shape that surrounds the through hole 21a formed in the outer body 20 with a lower opening 31a and is fixed, creating the second circulation path G2 between the heating unit 30 and the inner body 20b. Additionally, the internal area of the lower support member 31 is arranged to form the third circulation path G3, and multiple second ventilation holes 31b are formed on the side of the lower support member 31 to allow communication between the second circulation path G2 and the third circulation path G3 through the second ventilation holes 31b.

The support member 32 forms a first coupling part 32b where the bottom of the heating member 33 is coupled to the top of the supporting body 32a, and a second coupling part 32c where the top of the lower support member 31 is inserted into the bottom of the supporting body 32a. This configuration creates an insulation layer T sealed by the supporting body 32a between the coupled lower support member 31 and the heating member 33, minimizing the transfer of heat generated by the heating member 33 to the outside.

The heating member 33 takes the form of a storage container with a reflective member 33a that reflects light and heat. A heating lamp 33c, driven by electricity supplied from the control box 90, is installed on the inner side of the reflective member 33a, and the top of the reflective member 33a is sealed with a protective glass 33b to prevent exposure of light generated by the heating lamp 33c to the outside. Additionally, it prevents contamination of the heating lamp 33c and the reflective member 33a by blocking the fall of oil generated during the cooking process.

By configuring the heating unit 30 in this way, an exhaust groove E is formed at a certain interval between the side of the heating member 33 and the oil collector 222b of the inner body 20b. Through this exhaust groove E, smoke passing through the second circulation path G2 is discharged.

A platinum catalyst filter 74 installed around the heating unit 30 is a structure coated with platinum on a ceramic structure organized in a mesh shape. It decomposes nitrogen dioxide ($NO_2$) in the air into nitrogen ($N_2$) and oxygen ($O_2$).

For effective decomposition of nitrogen dioxide, the platinum catalyst filter 74 requires a temperature between 200° C. and 400° C. Thus, it is desirable to place the platinum catalyst filter 74 adjacent to the heating member 33 so that the heat generated by the heating member 33 is quickly transferred to the platinum catalyst filter 74.

The grill plate 40 supported by the support base 221b of the second support 22b constituting the aforementioned inner body 20b is configured to allow liquids such as oil and moisture generated during the cooking process to be discharged into the oil collector 222b provided in the second support 22b through the discharge hole 41.

In FIG. 4, a reference cross-sectional view explaining the internal structure and installation state of the vibration detection means 80 according to the present invention is shown. Additionally, FIGS. 5 and 6 show a perspective view of the vibration detection means 80 according to the present invention. As shown, the vibration detection means 80 is combined with a retainer 82 having a groove 83 on the inner side of a housing 81 to fix it to the first extension plate 22a of the outer body 20. The groove 83 of the retainer 82 is freely rotatably combined with steel balls B, and a fixing member 85 is installed on the front side of the retainer 82 to prevent the steel balls B from detaching. The retainer 82 has a detector 86 installed on it, and a vibration sensor 88 is installed at the end of a rod 87 provided in the detector 86 to detect vibration changes on the table due to earthquakes or various external impacts. The detector 86 detects the vibration of the vibration detection means 80 through the vibration sensor 88 and transmits it to the control box 90.

The above-described detector 86 and vibration sensor 88 measure the degree of vibration of the target object by detecting physical changes due to vibrations of the target object, such as earthquakes or external impacts. The sensing components for detecting amplitude variations due to vibrations can take various forms and are provided in the field of sensing physical changes due to vibrations, including the use of vibration sensors 88.

The control box 90 according to the present invention is placed externally to the outer body 20 and, if the temperature of the heating lamp 33c exceeds a set limit or if the grill plate 40 detaches, it cuts off power supplied to the heating lamp 33c. Based on the temperature information of the grill plate 40 transmitted through the temperature and pressure detection means 70, it illuminates a differentiated color indicator light 93 to inform the user of the temperature status of the grill plate intuitively. It also provides alerts or alarms through the warning light 91 or audible signals according to signals from the water level sensor 77, notifying the user of the time to replenish water. Furthermore, it can detect and cut off power to the heating lamp 33c and heating element 54 if the temperature exceeds the set limit as detected by the bimetal temperature sensor 52. The control box 90 is configured to stop the operation of the electric roaster 10 if vibrations exceeding a certain threshold are detected by the vibration detection means 80.

By configuring the control box 90 as above, the electric roaster 10 can prevent accidents in hazardous situations, such as overheating of the heating lamp 33c or detachment of the grill plate 40. The differentiated color indicator light 93 using colors such as blue, yellow, and red provides the user with intuitive information about the current temperature status of the grill plate 40. Also, the control box 90, which receives signals from the water level sensor 77 or weight measurement device 56, can alert the user to the timing of water replenishment through means such as the warning light 91 or audible alarms, ensuring optimal functionality for the oil collector 222b or heating container 55.

The control box 90 adjusts the current supplied to the heating lamp 33c to lower the temperature if the measured temperature of the grill plate 40 exceeds the user-set temperature, and vice versa, raises the temperature by adjusting the current supplied to the heating lamp 33c if the measured temperature of the grill plate 40 is below the user-set temperature. If the control box 90 fails to control the temperature smoothly and it exceeds the set limit, it cuts off power to the heating lamp 33c to prevent accidents. Additionally, if the vibration detection means 80 transmits a signal indicating vibrations above a certain amplitude, the control box 90 acts to cut off power to the electric roaster 10 to stop its operation.

The present invention, configured as described above, operates to remove foreign substances in the smoke, generated when cooking meat on the grill plate 40, by the repeated circulation process where the smoke is introduced into the first ventilation hole 232b of the third support 23b through the operation of the blower 60. The introduced smoke follows the circulation path: the first circulation path G1→connecting path 51→fourth circulation path G4→through hole 21a→third circulation path G3→second ventilation hole 31b→second circulation path G2→exhaust groove E to reach the grill plate 40.

The electric roaster 10 presented in this invention is used by supporting it on a table or the like through the vibration detection means 80 installed at the lower part of the first extension plate 22a of the outer body 20 and buried in the table. When external shocks or vibrations occur, the position of the vibration detection means 80 is shifted by the steel balls B supporting the vibration detection means 80. The vibration sensor 88 of the vibration detection means 80 detects the amplitude of vibrations occurring in the vibration detection means 80 on the table, and the measured value is converted into a numerical value to measure the vibrations of the target object. The detector 86 of the vibration detection means 80 transmits the measured vibration information to the control box 90. The control box 90 cuts off power to the electric roaster 10 if the transmitted vibration information indicates vibrations beyond the set amplitude, thereby stopping the operation of the electric roaster 10.

The "Air Circulation Electric Roaster for Table with Safety Function" proposed in this invention circulates and removes foreign substances contained in smoke generated during the cooking process in the form of grilling meat. According to the present invention, it not only maintains a comfortable cooking environment, thereby increasing user satisfaction but also effectively removes smoke and foreign substances, reducing air pollution in the surrounding area where the roaster is used. Furthermore, when there are temperature changes in the grill plate or vibrations or tremors exceeding a certain degree occur in the roaster, and when the cooking of food through the grill plate is completed and ready to move, the power supplied to the roaster is automatically cut off. Thus, the present invention is expected to be truly beneficial as it ensures safer use of cooking utensils.

The Air Circulation Electric Roaster for Table with Safety Function 10 presented in this invention is not limited to the embodiments described and the accompanying drawings but can be replaced, modified, and changed in various forms within the scope of the technical concept aimed at by the present invention, provided such substitutions, modifications, and changes are within the usual knowledge of those skilled in the art to which the present invention pertains.

What is claimed is:

1. An air circulation electric roaster for table with safety function comprising:
    an outer body configured with an upward-extending first extension plate at the top;
    multiple vibration detector installed at a lower part of the first extension plate provided on the outer body to detect vibrations caused by earthquakes or external impacts when vibrations occur on the electric roaster;
    an inner body comprising a first support fixed to a bottom surface of the outer body, a second support configured to store water in an inner space of an oil collector, and a third support installed with a first ventilation hole;
    a water level sensor installed on one side of the oil collector of the third support constituting the inner body to detect a water level of the water stored in the oil collector;
    a temperature and pressure detector configured with a temperature sensor and a relay installed to detect a weight of a grill plate applied to the temperature sensor;
    a bottom cap coupled to a lower part of the outer body to create a fourth circulation path in an internal area, installed with a connecting path on one side, equipped with a heating element in the central lower area, and installed with a heating container capable of storing water on a upper part of the heating element;
    a blower composed of a drive motor and a blower fan, with the blower fan connected to the connecting path installed on one side of the bottom cap;
    a heating unit comprising a heating member; and
    a control box; characterized by being equipped with a safety function, constituting an air-circulating electric roaster.

2. The air circulation electric roaster for table according to claim 1, wherein the vibration detector is provide with a housing, a retainer equipped with multiple retention grooves spaced at regular intervals along a circular path on the lower surface, multiple steel balls freely rotatably coupled to the retention grooves, and a detector equipped with a rod on which a vibration sensor is installed.

3. The air circulation electric roaster for table according to claim 2, wherein the housing is fixed to the first extension plate of the outer body and coupled to the inner side of the housing, the retainer is equipped with a fixing member installed on a front side, fixed with fixing bolts to prevent the detachment of the steel balls, and the detector detects vibrations generated in the vibration detector through the vibration sensor and transmits the detected signal to the control box.

4. The air circulation electric roaster for table according to claim 3, wherein the outer body is formed with a through hole at its inner lower center and a metal mesh is installed on the upper part of the through hole to cover the through hole by the mesh, wherein the second support of the inner body is formed with a support base at its top end for supporting the grill plate and formed with a sealed hopper-shaped oil collector at its inner lower end, and wherein the third support is formed with a second extension plate extending outward to fix it on the upper surface of the first extension plate of the outer body and installed with a first ventilation hole to allow smoke generated during the cooking process of heating meat to flow in.

5. The air circulation electric roaster for table according to claim 4, wherein the temperature and pressure detector is installed in the inner area of the inner body to be vertically slidable by a guide member fixed to the inner body, and wherein the temperature sensor contacting with a lower part of the grill plate is installed on a top end of the temperature and pressure detector and the relay is installed on the lower end of the temperature and pressure detection means to detect the weight of the grill plate applied to the temperature sensor.

6. The air circulation electric roaster for table according to claim 5, wherein the heating unit includes a support member with multiple second ventilation holes formed on the side, a support member, and a heating member with a reflective member for reflecting light and heat, a protective glass for sealing a top end of the reflective member, and a heating lamp installed in the inner area of the reflective member, the support member being configured to have supporting body to make an insulating layer between the support member and the heating unit by combining the lower end of the heating unit with a first coupling part and inserting the top end of the support member in a second coupling part.

7. The air circulation electric roaster for table according to claim 6, wherein a bimetal temperature sensor is further installed at the lower part of the outer body to detect a signal indicating a temperature of the air passing through the fourth circulation path exceeding a set temperature, and to transmit the signal to the control box to cut off a power supplied to the heating lamp and the heating element.

8. The air circulation electric roaster for table according to claim 7, further comprising a plasma generator and a weight measuring device, the plasma generator being installed in a connecting pipe connecting the bottom cap and the blower, and a weight measuring device being installed below the heating element to measure a weight of the water stored in the heating container, a signal indicating the amount of water in the heating container decreased below a preset amount being sent to the control box in case of the water in the heating container decreased below the preset amount.

9. The air circulation electric roaster for table according to claim 8, further comprising a platinum catalyst filter coated with platinum and organized in a mesh shape installed around the heating element.

10. The air circulation electric roaster for table according to claim 9, wherein the control box is configured to cut off the power supplied to the heating lamp when a temperature of the heating lamp exceeds the set limit or if the grill plate is detached, to illuminates a different color of an indicator light according to a temperature information of the grill plate transmitted through the temperature and pressure detector for informing a user of a temperature status of the grill plate visually, to provide a warning light or alarm sound according to a detection signal of the water level sensor in order to notify the user of the timing for water replenishment to cut off the power supplied to the heating lamp and the heating element based on the detection signal of the bimetal temperature sensor, and to cut off the power supplied to the electric roaster in the case of the vibration detector detecting vibrations beyond a certain degree.

* * * * *